Nov. 29, 1955 E. J. McBRIDE 2,725,202
CREEL
Filed Sept. 22, 1953 2 Sheets-Sheet 1
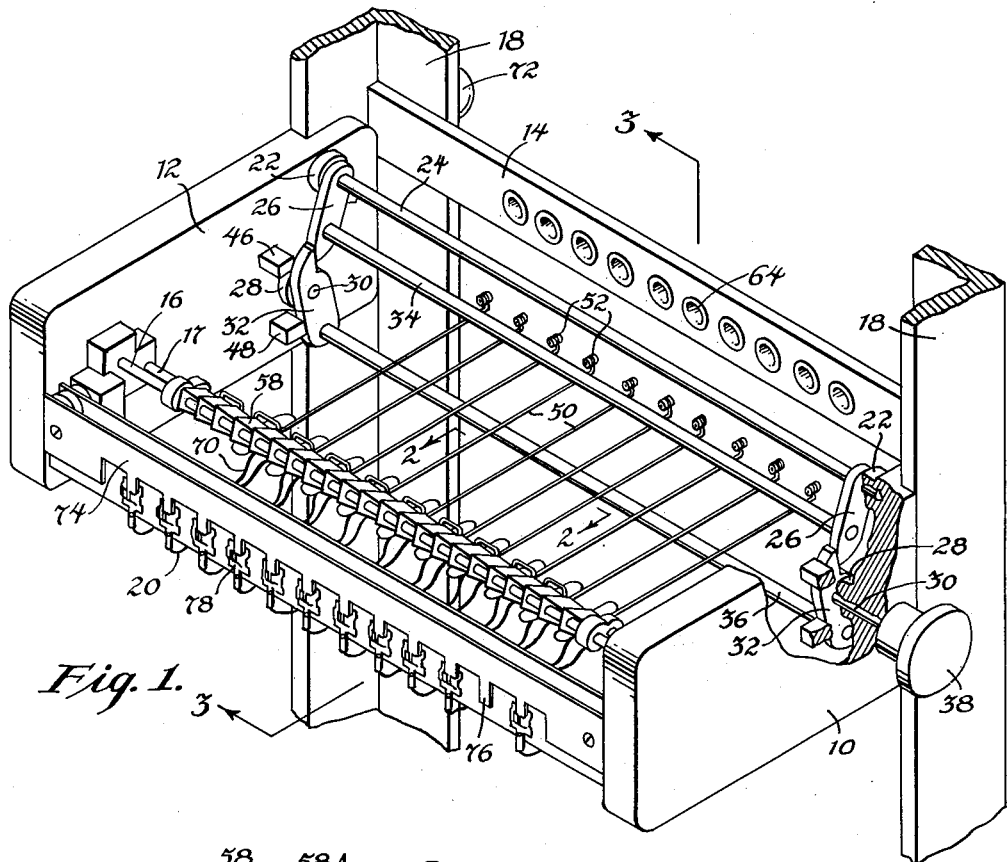
Fig. 1.
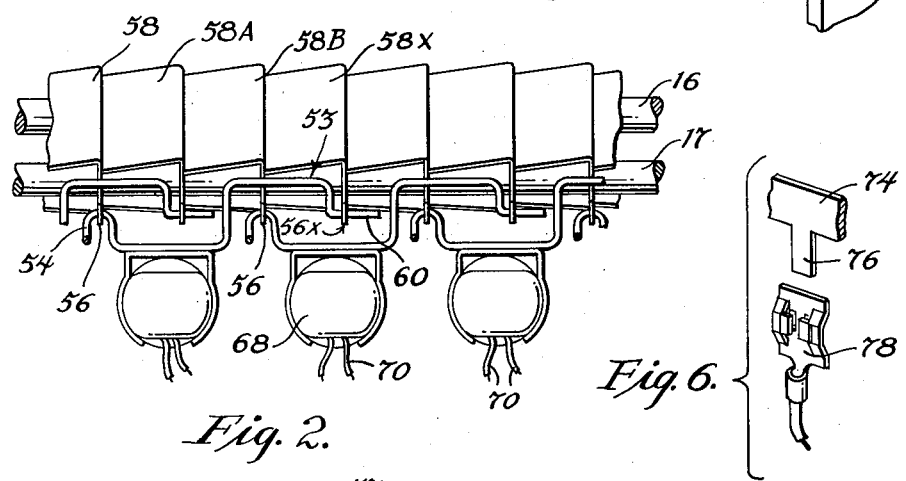
Fig. 2.
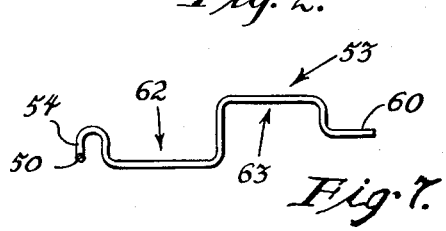
Fig. 7.
Fig. 6.
INVENTOR.
EDWARD J. McBRIDE
BY Louis Necho
ATTORNEY.

Nov. 29, 1955     E. J. McBRIDE     2,725,202
CREEL
Filed Sept. 22, 1953     2 Sheets-Sheet 2
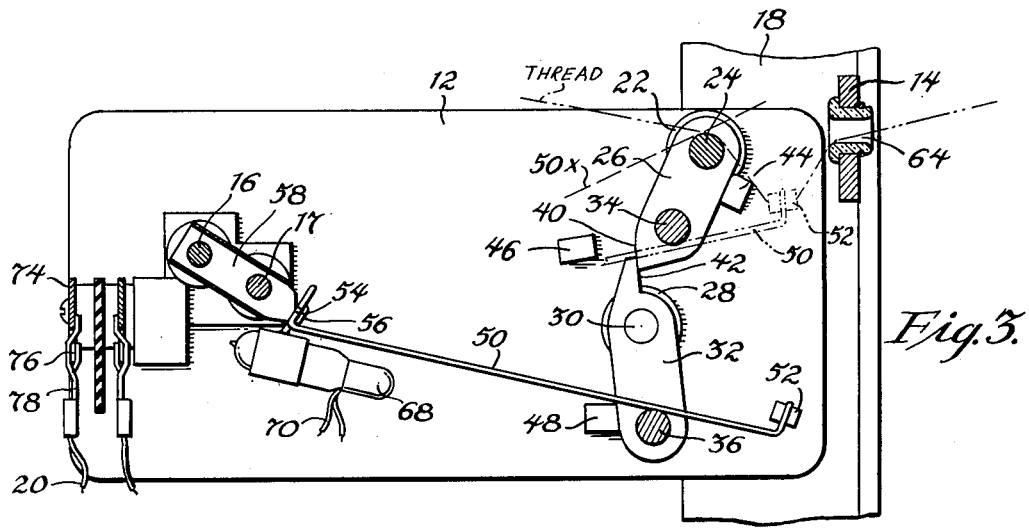
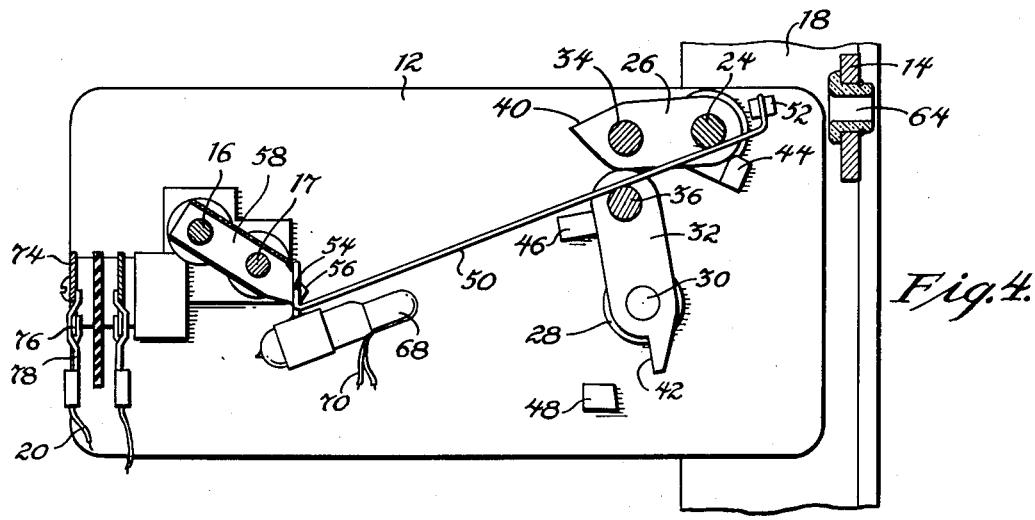
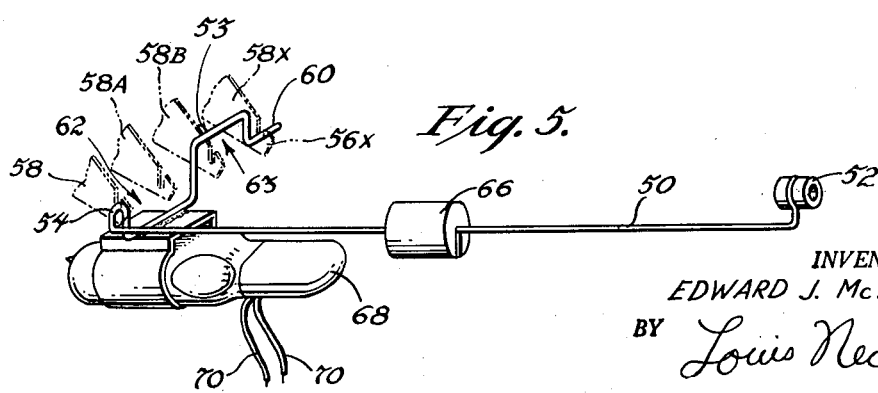
INVENTOR.
EDWARD J. McBRIDE
BY Louis Necho
ATTORNEY.

United States Patent Office 2,725,202
Patented Nov. 29, 1955

2,725,202
CREEL

Edward J. McBride, Philadelphia, Pa.

Application September 22, 1953, Serial No. 381,536

7 Claims. (Cl. 242—131)

This invention relates to a creel of the type disclosed in such prior patents as De Wolf No. 1,660,299 of February 21, 1928.

The object of the invention is to produce an improved creel of the type set forth.

The invention will be understood from the following specification and the accompanying drawings in which:

Fig. 1 is a perspective view of a creel embodying the invention.

Fig. 2 is an enlarged, elevational view looking in the direction of line 2—2 on Fig. 1.

Fig. 3 is a sectional view looking in the direction of line 3—3 on Fig. 1, showing the yarn guide, and associated parts, in two positions thereof.

Fig. 4 is similar to Fig. 3 but showing the same parts in a third position thereof.

Fig. 5 is a fragmentary, perspective view of one of the yarn guides shown detached.

Fig. 6 is a fragmentary, perspective, exploded view showing details of construction.

Fig. 7 is a view, partly in section and partly in elevation, showing details of construction.

The creel illustrated includes a frame work formed of end walls 10 and 12, rear bar 14 and a front rods 16 and 17, which are suitably secured together and to vertical standards 18.

The end walls 10 and 12 carry, on their juxtaposed faces, identical and horizontally registering upper hubs 22 which support an upper, fixed rod 24 which has a hard, polished surface, and on the ends of which are freely rotatable identical, horizontally registering dogs 26. The end walls 10 and 12 also carry identical horizontally registering hubs 28 to which are pivoted, as at 30, identical, horizontally registering dogs 32. The free ends of upper dogs 26 carry a rod 34 and the free ends of lower dogs 32 carry a rod 36. The lower dogs 32 are rotatable, in either direction, by a knob 38 and the upper and lower dogs are so proportioned and related that, when the lower dogs are rotated, in counterclockwise direction, from the position of Fig. 3 to the position of Fig. 4, the lower ends of dogs 32 will engage the lower ends of dogs 26 (as viewed in Fig. 3) and will move the upper dogs to the position of Fig. 4 so as to move rods 34 and 36 from their lower positions in Fig. 3 to their upper positions in Fig. 4. It will be noted that the free ends of upper dogs 26 are tapered or pointed as at 40 and that the free ends of lower dogs 32 are shouldered as at 42. The rotation of upper dogs 26 and lower dogs 32 in counterclockwise direction, as viewed in Figs. 3 and 4, is limited by stops 44 and 46, and the rotation of lower dogs 32 in clockwise direction, as viewed in these figures is limited by stop 48, or by engagement of the shouldered ends 42 of the lower dogs with the pointed ends 40 of the upper dogs, or by either of them.

The creel also includes yarn guiding and tensioning devices one of which is shown detached in Fig. 5 from which it is seen that each of said devices includes an arm 50, a gimlet 52 at one end of the arm and a yoke 53 at the other end of the arm by means of which the arm 50 is pivotally mounted for movement to the solid line position of Fig. 3, to the solid line position of Fig. 4, or to any intermediate position such as the position shown in broken lines in Fig. 3. To this end, the yoke referred to is provided with a loop 54 which is adapted to engage a hook 56 formed or carried by a combined support and spacer 58 carried by the front rods 16 and 17. The other end 60 of the yoke is adapted to rest in a similar hook 56x of a spacer 58x also carried by rods 16 and 17. Spacer 58x is separated by similar spacers which, for convenience, have been designated by reference characters 58A and 58B. The intermediate portion of each yoke is bent to form oppositely facing recesses which are indicated by arrows 62 and 63. By means of these recesses, the body of the yoke 53 clears the hooks on the intermediate spacers 58A and 58B and thus permits the hooks 54 on other yokes to engage the hooks on corresponding spacers as best shown in Fig. 2. It will be noted that, by this arrangement, the arms 50 are rotatable about the horizontal axes of loops 54 and that each arm is individually removable without disturbing adjacent guide devices.

It will be noted that in the intermediate broken line, operating position of Fig. 3 the arms 50 of the yarn supporting and guiding devices about the underside of rod 34 so as to minimize, or prevent, jiggling of the yarn guides. On the other hand, when a yarn breaks, the corresponding arm 50 moves down until it is stopped by rod 36.

If it is desired to put a yarn guiding device out of use, the arm 50 of such yarn guiding device is placed over upper rod 24 as shown by broken line 50x in Fig. 3. In order to vary the tension on the yarn, I provide weights 66 which slidably engage the arms 50 and which are movable toward and away from the fulcrum point as may be required.

The creel also includes automatic, combined warning and stop motion devices which are operable only when one or more threads break. As illustrated, the warning and stop motion device includes a mercury switch 68 carried by each guide arm 50 and so arranged that, when a guide arm moves down to a predetermined position, such as the solid line position of Fig. 3, the mercury flows, to the right as shown in Figs. 4 and 5, and completes the circuit through wires 70. As long as guide arms 50 are at, or above a predetermined position, the circuit through wires 70 will remain open. The wires 70 are electrically connected to a source of energy, not shown, and to a visual and/or auditory signalling device 72 which will indicate to the operator that a thread is running very slack or is broken. The wires 70 are also connected to a stop motion which will automatically stop the warping machine. Since the specific circuit involved forms no part of the invention and since any average electrician can connect the wires 70 in a manner to energize signal 72 and/or to stop the warping machine, the wiring diagram has not been shown. However, for information as to the necessary wiring reference may be had to the following patents:

| Name | Number | Date |
|---|---|---|
| F. Lambach | 2,400,556 | May 21, 1946. |
| F. Lambach | 2,405,218 | Aug. 6, 1946. |

In order to make the yarn guide devices more independent from each other and, hence, more readily removable individually, I provide a front bar 74 the bottom edge of which has pendent tongues 76 each of which is adapted to be detachably engaged by a clip 78 which is connected to the circuit which includes the wires 70. In other words, the circuit which includes the wires 70 of each guide is individually connected to a clip 78 which in turn detachably engages one of the tongues 76. By this means, if a mercury switch, or some other part of one of the yarn guide devices is damaged, it can be individually removed and a new one can be installed with minimum, or no, interference with the other yarn devices.

What I claim is:

1. A creel including end walls, a back wall and a front wall, there being thread guide openings in said back wall, a fixed rod carried by said end walls and disposed near and parallel to said back wall, a pair of upper dogs pivoted at their upper ends to said end walls for rotation about the axis of said fixed rod, a first movable rod carried by the lower free ends of said dogs and disposed parallel to said fixed rod, a pair of lower dogs pivoted at their upper ends to said end walls for rotation about an axis parallel to the axis of said fixed rod, a second movable rod carried by the lower free ends of said dogs, yarn guide arms pivotally carried by said front wall, yarn guide gimlets carried by the free ends of said arms and through which yarn passes, and means for rotating said lower dogs about an axis parallel to the axis of said fixed rod, said upper and lower dogs being so related that, when said lower dogs are rotated, in counterclockwise direction, their lower free ends engage the free lower ends of, and rotate, said upper dogs to a first position in which said first movable rod is elevated to a position in which it is out of contact with said guide arms and said second movable arm engages said guide arms and raises them to a position in which said gimlets are in registration with said openings in said back wall, said upper and lower dogs being also so related that when said lower dogs are rotated in clockwise, said first movable rod is moved downwardly into engagement with said guide arms and said second movable rod is moved downwardly out of engagement with said guide arms, said guide arms being sustained in a position between said first and second movable rods by yarns passing through said gimlets.

2. The structure recited in claim 1 in which said fixed rod has a hard polished surface.

3. The structure recited in claim 1 and stops carried by said end walls for limiting the rotation of said lower dogs in upper dogs-engaging direction, said stop being so located with reference to the axis of rotation of said lower dogs that the lower dogs engage said stop after having moved past dead center.

4. The structure recited in claim 1 and means operable upon movement of any of said arms to a predetermined lower position to energize a signal.

5. The structure recited in claim 1 in which said guide arms are individually detachably mounted.

6. The structure recited in claim 1 and a weight slidably engaging said guide arm.

7. A creel including a front support, a plurality of yarn guides each including an arm and an eye at one end of said arm, means pivotally connecting the other end of each of said arms to said support, a pair of upper and lower horizontally disposed, vertically spaced rods between which the free ends of said arms project, means pivotally mounting said rods for rotation about spaced horizontal axes, and means for rotating said rods to a first upper position in which the lower of said rods engages the undersides of said arms and raises them to a predetermined, upper position and to a second lower position in which the upper of said rods rests on said guides.

References Cited in the file of this patent
UNITED STATES PATENTS

| | | |
|---|---|---|
| 454,255 | Connor | June 16, 1891 |
| 575,663 | Bosworth | Jan. 19, 1897 |
| 1,004,594 | Ryan | Oct. 3, 1911 |
| 2,289,930 | Payen | July 14, 1942 |